(12) United States Patent
Lee et al.

(10) Patent No.: US 9,641,284 B2
(45) Date of Patent: May 2, 2017

(54) METHOD AND APPARATUS FOR RECEIVING OR TRANSMITTING INTERFERENCE INFORMATION

(71) Applicant: LG ELECTRONICS INC., Seoul (KR)

(72) Inventors: Hyunho Lee, Seoul (KR); Hyungtae Kim, Seoul (KR); Hanjun Park, Seoul (KR); Kunil Yum, Seoul (KR); Kijun Kim, Seoul (KR); Jonghyun Park, Seoul (KR); Youngtae Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 175 days.

(21) Appl. No.: 14/575,702

(22) Filed: Dec. 18, 2014

(65) Prior Publication Data

US 2015/0181464 A1    Jun. 25, 2015

Related U.S. Application Data

(60) Provisional application No. 61/918,652, filed on Dec. 19, 2013.

(51) Int. Cl.
*H04L 1/00* (2006.01)
*H04L 5/00* (2006.01)

(52) U.S. Cl.
CPC .......... *H04L 1/0026* (2013.01); *H04L 1/0041* (2013.01); *H04L 1/0045* (2013.01); *H04L 1/0072* (2013.01); *H04L 5/0053* (2013.01)

(58) Field of Classification Search
CPC ... H04L 1/0026; H04L 5/0053; H04L 1/0072; H04L 1/0041; H04L 1/0045
USPC ........................................ 370/310, 328, 329
See application file for complete search history.

(56) References Cited

U.S. PATENT DOCUMENTS

| | | | | |
|---|---|---|---|---|
| 2010/0309864 A1* | 12/2010 | Tamaki | ................. | H04W 52/42 370/329 |
| 2011/0182256 A1* | 7/2011 | Fodor | ................... | H04B 7/024 370/329 |
| 2014/0092760 A1* | 4/2014 | Geirhofer | ............. | H04W 24/10 370/252 |
| 2015/0295695 A1* | 10/2015 | Davydov | .............. | H04W 72/12 370/329 |

* cited by examiner

*Primary Examiner* — Obaidul Huq
(74) *Attorney, Agent, or Firm* — Lee, Hong, Degerman, Kang & Waimey

(57) ABSTRACT

A method for receiving information for interference cancellation of a user equipment (UE) includes detecting downlink control information including interference control information for a specific resource block (RB) scheduled for the UE by using an index of the specific RB, wherein the interference control information for the specific RB includes control information related to interference signal in the specific RB and indicates that the interference control information for the specific RB is the same as interference control information for one or more RBs having a series of indices subsequent to the index of the specific RB, and performing cancellation of interference signal corresponding to the interference control information in the specific RB and the one or more RBs using the interference control information for the specific RB.

14 Claims, 6 Drawing Sheets

METHOD AND APPARATUS FOR RECEIVING OR TRANSMITTING INTERFERENCE INFORMATION

Pursuant to 35 U.S.C. §119(e), this application claims the benefit of U.S. Provisional Application No. 61/918,652, filed on Dec. 19, 2013, the contents of which are hereby incorporated by reference herein in their entirety.

BACKGROUND OF THE INVENTION

Field of the Invention

The present invention relates to a wireless communication system, and more particularly, to a method and apparatus for transmitting and receiving information for interference cancellation.

Discussion of the Related Art

Recently, various devices requiring machine-to-machine (M2M) communication and high data transfer rate, such as smartphones or tablet personal computers (PCs), have appeared and come into widespread use. This has rapidly increased the quantity of data which needs to be processed in a cellular network. In order to satisfy such rapidly increasing data throughput, carrier aggregation (CA) technology that efficiently uses more frequency bands, cognitive radio technology, multiple antenna (MIMO) technology for increasing data capacity in a restricted frequency, multiple-base-station cooperative technology, etc. have been developed. In addition, communication environments have evolved such that the density of accessible nodes is increased in the vicinity of a user equipment (UE). The node includes one or more antennas and refers to a fixed point capable of transmitting/receiving radio frequency (RF) signals to/from the user equipment (UE). A communication system including high-density nodes may provide a communication service of higher performance to the UE by cooperation between nodes.

A multi-node coordinated communication scheme in which a plurality of nodes communicates with a user equipment (UE) using the same time-frequency resources has much higher data throughput than legacy communication scheme in which each node operates as an independent base station (BS) to communicate with the UE without cooperation.

A multi-node system performs coordinated communication using a plurality of nodes, each of which operates as a base station or an access point, an antenna, an antenna group, a remote radio head (RRH), and a remote radio unit (RRU). Unlike the conventional centralized antenna system in which antennas are concentrated at a base station (BS), nodes are spaced apart from each other by a predetermined distance or more in the multi-node system. The nodes can be managed by one or more base stations or base station controllers which control operations of the nodes or schedule data transmitted/received through the nodes. Each node is connected to a base station or a base station controller which manages the node through a cable or a dedicated line.

The multi-node system can be considered as a kind of Multiple Input Multiple Output (MIMO) system since dispersed nodes can communicate with a single UE or multiple UEs by simultaneously transmitting/receiving different data streams. However, since the multi-node system transmits signals using the dispersed nodes, a transmission area covered by each antenna is reduced compared to antennas included in the conventional centralized antenna system. Accordingly, transmit power required for each antenna to transmit a signal in the multi-node system can be reduced compared to the conventional centralized antenna system using MIMO. In addition, a transmission distance between an antenna and a UE is reduced to decrease in pathloss and enable rapid data transmission in the multi-node system. This can improve transmission capacity and power efficiency of a cellular system and meet communication performance having relatively uniform quality regardless of UE locations in a cell. Further, the multi-node system reduces signal loss generated during transmission since base station(s) or base station controller(s) connected to a plurality of nodes transmit/receive data in cooperation with each other. When nodes spaced apart by over a predetermined distance perform coordinated communication with a UE, correlation and interference between antennas are reduced. Therefore, a high signal to interference-plus-noise ratio (SINR) can be obtained according to the multi-node coordinated communication scheme.

Owing to the above-mentioned advantages of the multi-node system, the multi-node system is used with or replaces the conventional centralized antenna system to become a new foundation of cellular communication in order to reduce base station cost and backhaul network maintenance cost while extending service coverage and improving channel capacity and SINR in next-generation mobile communication systems.

SUMMARY OF THE INVENTION

Accordingly, the present method is directed to a method and apparatus for transmitting and receiving information for interference cancellation that substantially obviate one or more problems due to limitations and disadvantages of the related art.

An object of the present invention is to provide a method and apparatus for transmitting and receiving information for interference cancellation.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for receiving information for interference cancellation of a user equipment (UE) includes detecting downlink control information including interference control information for a specific resource block (RB) scheduled for the UE by using an index of the specific RB, wherein the interference control information for the specific RB includes control information related to interference signal in the specific RB and indicates that the interference control information for the specific RB is the same as interference control information for one or more RBs having a series of indices subsequent to the index of the specific RB; and performing cancellation of interference signal corresponding to the interference control information in the specific RB and the one or more RBs using the interference control information for the specific RB.

Additionally or alternatively, the index of the specific RB may be a specific index among indices of RBs scheduled for the UE and overlapping one or more consecutive RBs in which the interference signal is transmitted.

Additionally or alternatively, the detection may be skipped for the series of indices.

In another aspect of the present invention, a method for transmitting information for interference cancellation of a user equipment (UE) by a serving base station of the UE includes receiving interference control information for a specific resource block (RB) scheduled for the UE from an interference base station; and transmitting downlink control information including the interference control information for the specific RB with cyclic redundancy check (CRC) bits scrambled using an index of the specific RB to the UE, wherein the interference control information for the specific RB includes control information related to interference signal in the specific RB and indicates that the interference control information for the specific RB is the same as interference control information for one or more RBs having a series of indices subsequent to the index of the specific RB.

Additionally or alternatively, the index of the specific RB may be a specific index among indices of RBs scheduled for the UE and overlapping one or more consecutive RBs in which the interference signal is transmitted.

Additionally or alternatively, the transmission of the interference control information with the CRC bits scrambled using the series of indices may be skipped.

In another aspect of the present invention, a user equipment (UE) configured to receive information for interference cancellation, the UE comprising a radio frequency (RF) unit and a processor configured to control the RF unit, wherein the processor is configured to detect downlink control information including interference control information for a specific resource block (RB) scheduled for the UE by using an index of the specific RB, wherein the interference control information for the specific RB includes control information related to interference signal in the specific RB and indicates that the interference control information for the specific RB is the same as interference control information for one or more RBs having a series of indices subsequent to the index of the specific RB, and perform cancellation of interference signal corresponding to the interference control information in the specific RB and the one or more RBs using the interference control information for the specific RB.

In another aspect of the present invention, a base station for transmitting information for interference cancellation, the base station comprising: a radio frequency (RF) unit; and a processor configured to control the RF unit, wherein the processor is configured to receive interference control information for a specific resource block (RB) scheduled for a user equipment (UE) from an interference base station and to transmit downlink control information including the interference control information for the specific RB with cyclic redundancy check (CRC) bits scrambled using an index of the specific RB to the UE, and wherein the interference control information for the specific RB includes control information related to interference signal in the specific RB and indicates that the interference control information for the specific RB is the same as interference control information for one or more RBs having a series of indices subsequent to the index of the specific RB.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1A:
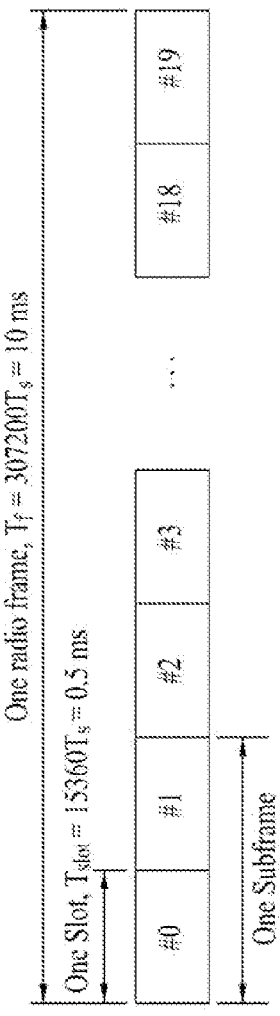
FIGS. 1(a) and 1(b) illustrate an exemplary radio frame structure in a wireless communication system.

Reference will now be made in detail to the preferred embodiments of the present invention, examples of which are illustrated in the accompanying drawings. The accompanying drawings illustrate exemplary embodiments of the present invention and provide a more detailed description of the present invention. However, the scope of the present invention should not be limited thereto.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present invention, a user equipment (UE) is fixed or mobile. The UE is a device that transmits and receives user data and/or control information by communicating with a base station (BS). The term 'UE' may be replaced with 'terminal equipment', 'Mobile Station (MS)', 'Mobile Terminal (MT)', 'User Terminal (UT)', 'Subscriber Station (SS)', 'wireless device', 'Personal Digital Assistant (PDA)', 'wireless modem', 'handheld device', etc. A BS is typically a fixed station that communicates with a UE and/or another BS. The BS exchanges data and control information with a UE and another BS. The term 'BS' may be replaced with 'Advanced Base Station (ABS)', 'Node B', 'evolved-Node B (eNB)', 'Base Transceiver System (BTS)', 'Access Point (AP)', 'Processing Server (PS)', etc. In the following description, BS is commonly called eNB.

In the present invention, a node refers to a fixed point capable of transmitting/receiving a radio signal to/from a UE by communication with the UE. Various eNBs can be used as nodes. For example, a node can be a BS, NB, eNB, pico-cell eNB (PeNB), home eNB (HeNB), relay, repeater, etc. Furthermore, a node may not be an eNB. For example, a node can be a radio remote head (RRH) or a radio remote unit (RRU). The RRH and RRU have power levels lower than that of the eNB. Since the RRH or RRU (referred to as RRH/RRU hereinafter) is connected to an eNB through a dedicated line such as an optical cable in general, cooperative communication according to RRH/RRU and eNB can be smoothly performed compared to cooperative communication according to eNBs connected through a wireless link. At least one antenna is installed per node. An antenna may refer to an antenna port, a virtual antenna or an antenna group. A node may also be called a point. Unlink a conventional centralized antenna system (CAS) (i.e. single node system) in which antennas are concentrated in an eNB and controlled an eNB controller, plural nodes are spaced apart at a predetermined distance or longer in a multi-node system. The plural nodes can be managed by one or more eNBs or eNB controllers that control operations of the nodes or schedule data to be transmitted/received through the nodes. Each node may be connected to an eNB or eNB controller managing the corresponding node via a cable or a dedicated line. In the multi-node system, the same cell identity (ID) or different cell IDs may be used for signal transmission/reception through plural nodes. When plural nodes have the same cell ID, each of the plural nodes operates as an antenna group of a cell. If nodes have different cell IDs in the multi-node system, the multi-node system can be regarded as a multi-cell (e.g. macro-cell/femto-cell/pico-cell) system. When multiple cells respectively configured by plural nodes are overlaid according to coverage, a network configured by multiple cells is called a multi-tier network. The cell ID of the RRH/RRU may be identical to or different from the cell ID of an eNB. When the RRH/RRU and eNB use different cell IDs, both the RRH/RRU and eNB operate as independent eNBs.

In a multi-node system according to the present invention, which will be described below, one or more eNBs or eNB controllers connected to plural nodes can control the plural nodes such that signals are simultaneously transmitted to or received from a UE through some or all nodes. While there is a difference between multi-node systems according to the nature of each node and implementation form of each node, multi-node systems are discriminated from single node systems (e.g. CAS, conventional MIMO systems, conventional relay systems, conventional repeater systems, etc.) since a plurality of nodes provides communication services to a UE in a predetermined time-frequency resource. Accordingly, embodiments of the present invention with respect to a method of performing coordinated data transmission using some or all nodes can be applied to various types of multi-node systems. For example, a node refers to an antenna group spaced apart from another node by a predetermined distance or more, in general. However, embodiments of the present invention, which will be described below, can even be applied to a case in which a node refers to an arbitrary antenna group irrespective of node interval. In the case of an eNB including an X-pole (cross polarized) antenna, for example, the embodiments of the preset invention are applicable on the assumption that the eNB controls a node composed of an H-pole antenna and a V-pole antenna.

A communication scheme through which signals are transmitted/received via plural transmit (Tx)/receive (Rx) nodes, signals are transmitted/received via at least one node selected from plural Tx/Rx nodes, or a node transmitting a downlink signal is discriminated from a node transmitting an uplink signal is called multi-eNB MIMO or CoMP (Coordinated Multi-Point Tx/Rx). Coordinated transmission schemes from among CoMP communication schemes can be categorized into JP (Joint Processing) and scheduling coordination. The former may be divided into JT (Joint Transmission)/JR (Joint Reception) and DPS (Dynamic Point Selection) and the latter may be divided into CS (Coordinated Scheduling) and CB (Coordinated Beamforming) DPS may be called DCS (Dynamic Cell Selection). When JP is performed, more various communication environments can be generated, compared to other CoMP schemes. JT refers to a communication scheme by which plural nodes transmit the same stream to a UE and JR refers to a communication scheme by which plural nodes receive the same stream from the UE. The UE/eNB combine signals received from the plural nodes to restore the stream. In the case of JT/JR, signal transmission reliability can be improved according to transmit diversity since the same stream is transmitted from/to plural nodes. DPS refers to a communication scheme by which a signal is transmitted/received through a node selected from plural nodes according to a specific rule. In the case of DPS, signal transmission reliability can be improved because a node having a good channel state between the node and a UE is selected as a communication node.

In the present invention, a cell refers to a specific geographical area in which one or more nodes provide communication services. Accordingly, communication with a specific cell may mean communication with an eNB or a node providing communication services to the specific cell. A downlink/uplink signal of a specific cell refers to a downlink/uplink signal from/to an eNB or a node providing communication services to the specific cell. A cell providing uplink/downlink communication services to a UE is called a serving cell. Furthermore, channel status/quality of a specific cell refers to channel status/quality of a channel or a communication link generated between an eNB or a node providing communication services to the specific cell and a UE. In 3GPP LTE-A systems, a UE can measure downlink channel state from a specific node using one or more CSI-RSs (Channel State Information Reference Signals) transmitted through antenna port(s) of the specific node on a CSI-RS resource allocated to the specific node. In general, neighboring nodes transmit CSI-RS resources on orthogonal CSI-RS resources. When CSI-RS resources are orthogonal, this means that the CSI-RS resources have different subframe configurations and/or CSI-RS sequences which specify subframes to which CSI-RSs are allocated according to CSI-RS resource configurations, subframe offsets and transmission periods, etc. which specify symbols and subcarriers carrying the CSI RSs.

In the present invention, PDCCH (Physical Downlink Control Channel)/PCFICH (Physical Control Format Indicator Channel)/PHICH (Physical Hybrid automatic repeat request Indicator Channel)/PDSCH (Physical Downlink Shared Channel) refer to a set of time-frequency resources or resource elements respectively carrying DCI (Downlink Control Information)/CFI (Control Format Indicator)/downlink ACK/NACK (Acknowledgement/Negative ACK)/downlink data. In addition, PUCCH (Physical Uplink Control Channel)/PUSCH (Physical Uplink Shared Channel)/PRACH (Physical Random Access Channel) refer to sets of time-frequency resources or resource elements respectively carrying UCI (Uplink Control Information)/uplink data/random access signals. In the present invention, a time-frequency resource or a resource element (RE), which is allocated to or belongs to PDCCH/PCFICH/PHICH/PDSCH/PUCCH/PUSCH/PRACH, is referred to as a PDCCH/PCFICH/PHICH/PDSCH/PUCCH/PUSCH/PRACH RE or PDCCH/PCFICH/PHICH/PDSCH/PUCCH/PUSCH/PRACH resource. In the following description, transmission of PUCCH/PUSCH/PRACH by a UE is equivalent to transmission of uplink control information/uplink data/random access signal through or on PUCCH/PUSCH/PRACH. Furthermore, transmission of PDCCH/PCFICH/PHICH/PDSCH by an eNB is equivalent to transmission of downlink data/control information through or on PDCCH/PCFICH/PHICH/PDSCH.

Figure 1B:
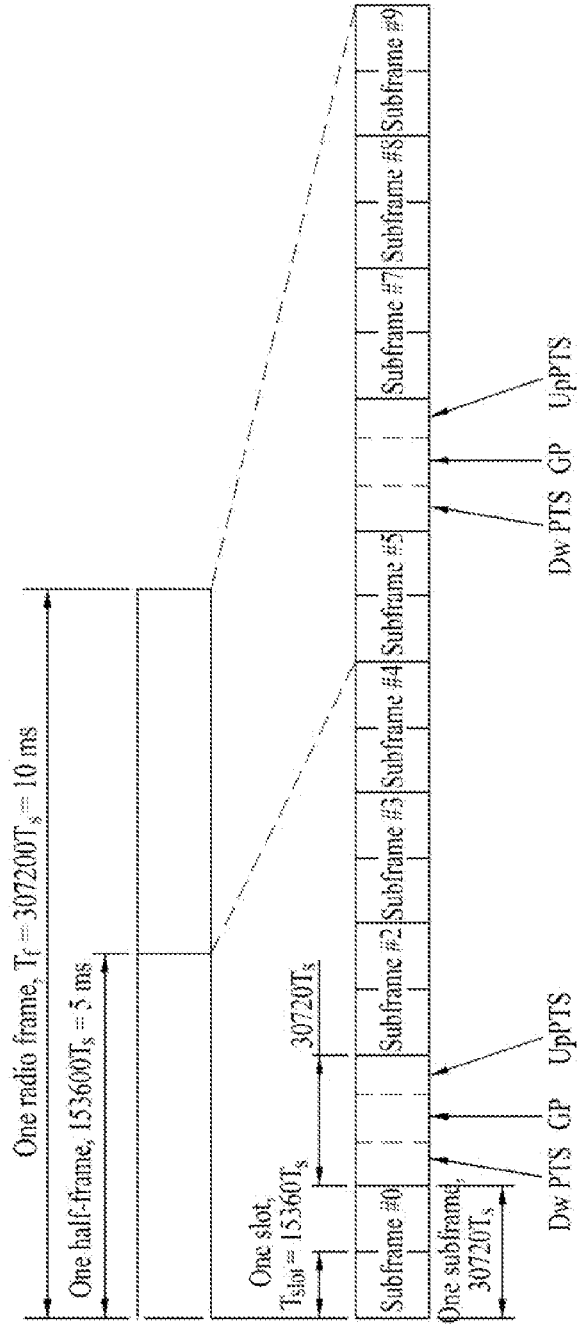

FIGS. 1(a) and 1(b) illustrate an exemplary radio frame structure used in a wireless communication system. FIG. 1(a) illustrates a frame structure for frequency division duplex (FDD) used in 3GPP LTE/LTE-A and FIG. 1(b) illustrates a frame structure for time division duplex (TDD) used in 3GPP LTE/LTE-A.

Pilot TimeSlot). DwPTS is a period reserved for downlink transmission and UpPTS is a period reserved for uplink transmission. Table 2 shows special subframe configuration.

TABLE 2

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | 12800 · $T_s$ | | |
| 8 | 24144 · $T_s$ | | | — | — | — |
| 9 | 13168 · $T_s$ | | | — | — | — |

Referring to FIGS. 1(a) and 1(b), a radio frame used in 3GPP LTE/LTE-A has a length of 10 ms (307200 Ts) and includes 10 subframes in equal size. The 10 subframes in the radio frame may be numbered. Here, Ts denotes sampling time and is represented as Ts=1/(2048*15 kHz). Each subframe has a length of 1 ms and includes two slots. 20 slots in the radio frame can be sequentially numbered from 0 to 19. Each slot has a length of 0.5 ms. A time for transmitting a subframe is defined as a transmission time interval (TTI). Time resources can be discriminated by a radio frame number (or radio frame index), subframe number (or subframe index) and a slot number (or slot index).

The radio frame can be configured differently according to duplex mode. Downlink transmission is discriminated from uplink transmission by frequency in FDD mode, and thus the radio frame includes only one of a downlink subframe and an uplink subframe in a specific frequency band. In TDD mode, downlink transmission is discriminated from uplink transmission by time, and thus the radio frame includes both a downlink subframe and an uplink subframe in a specific frequency band.

Table 1 shows DL-UL configurations of subframes in a radio frame in the TDD mode.

TABLE 1

| DL-UL configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Figure 2:
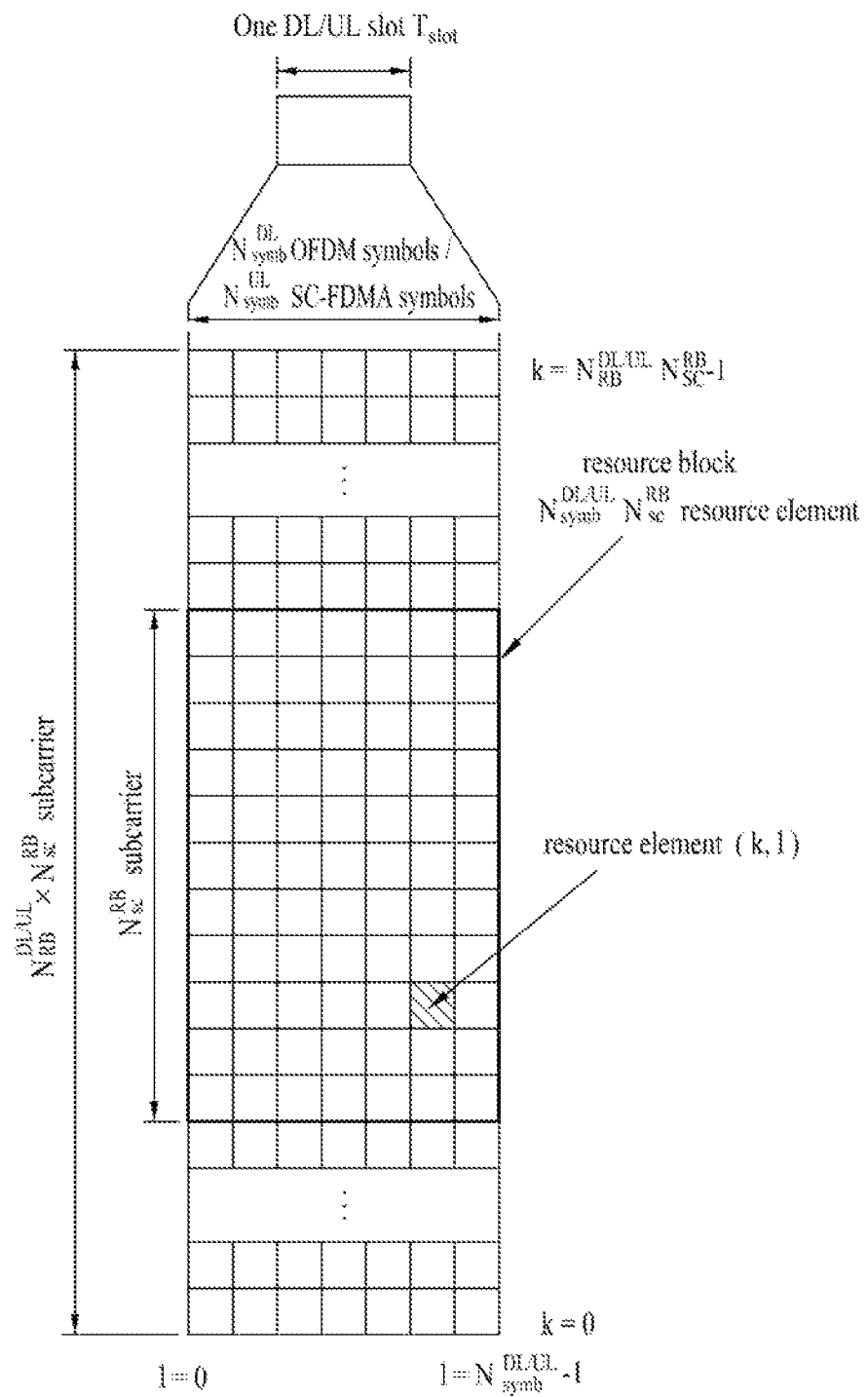
FIG. 2 illustrates an exemplary structure of a Downlink/Uplink (DL/UL) slot in a wireless communication system.

In Table 1, D denotes a downlink subframe, U denotes an uplink subframe and S denotes a special subframe. The special subframe includes three fields of DwPTS (Downlink Pilot TimeSlot), GP (Guard Period), and UpPTS (Uplink FIG. 2 illustrates an exemplary downlink/uplink slot structure in a wireless communication system. Particularly, FIG. 2 illustrates a resource grid structure in 3GPP LTE/LTE-A. A resource grid is present per antenna port.

Referring to FIG. 2, a slot includes a plurality of OFDM (Orthogonal Frequency Division Multiplexing) symbols in the time domain and a plurality of resource blocks (RBs) in the frequency domain. An OFDM symbol may refer to a symbol period. A signal transmitted in each slot may be represented by a resource grid composed of $N_{RB}^{DL/UL}*N_{sc}^{RB}$ subcarriers and $N_{symb}^{DL/UL}$ OFDM symbols. Here, $N_{RB}^{DL}$ denotes the number of RBs in a downlink slot and $N_{RB}^{UL}$ denotes the number of RBs in an uplink slot. $N_{RB}^{DL}$ and $N_{RB}^{UL}$ respectively depend on a DL transmission bandwidth and a UL transmission bandwidth. $N_{RB}^{DL}$ denotes the number of OFDM symbols in the downlink slot and $N_{symb}^{UL}$ denotes the number of OFDM symbols in the uplink slot. In addition, $N_{sc}^{RB}$ denotes the number of subcarriers constructing one RB.

An OFDM symbol may be called an SC-FDM (Single Carrier Frequency Division Multiplexing) symbol according to multiple access scheme. The number of OFDM symbols included in a slot may depend on a channel bandwidth and the length of a cyclic prefix (CP). For example, a slot includes 7 OFDM symbols in the case of normal CP and 6 OFDM symbols in the case of extended CP. While FIG. 2 illustrates a subframe in which a slot includes 7 OFDM symbols for convenience, embodiments of the present invention can be equally applied to subframes having different numbers of OFDM symbols. Referring to FIG. 2, each OFDM symbol includes $N_{RB}^{DL/UL}*N_{sc}^{RB}$ subcarriers in the frequency domain. Subcarrier types can be classified into a data subcarrier for data transmission, a reference signal subcarrier for reference signal transmission, and null subcarriers for a guard band and a direct current (DC) component. The null subcarrier for a DC component is a subcarrier remaining unused and is mapped to a carrier frequency (f0) during OFDM signal generation or frequency up-conversion. The carrier frequency is also called a center frequency.

An RB is defined by $N_{symb}^{DL/UL}$ (e.g. 7) consecutive OFDM symbols in the time domain and $N_{sc}^{RB}$ (e.g. 12) consecutive subcarriers in the frequency domain. For reference, a resource composed by an OFDM symbol and a subcarrier is called a resource element (RE) or a tone. Accordingly, an RB is composed of $N_{symb}^{DL/UL} * N_{sc}^{RB}$ REs. Each RE in a resource grid can be uniquely defined by an index pair (k, l) in a slot. Here, k is an index in the range of 0 to $N_{symb}^{DL/UL} * N_{sc}^{RB} - 1$ in the frequency domain and l is an index in the range of 0 to $N_{RB}^{DL/UL} - 1$.

Two RBs that occupy $N_{sc}^{RB}$ consecutive subcarriers in a subframe and respectively disposed in two slots of the subframe are called a physical resource block (PRB) pair. Two RBs constituting a PRB pair have the same PRB number (or PRB index). A virtual resource block (VRB) is a logical resource allocation unit for resource allocation. The VRB has the same size as that of the PRB. The VRB may be divided into a localized VRB and a distributed VRB depending on a mapping scheme of VRB into PRB. The localized VRBs are mapped into the PRBs, whereby VRB number (VRB index) corresponds to PRB number. That is, nPRB=nVRB is obtained. Numbers are given to the localized VRBs from 0 to $N_{VRB}^{DL} - 1$, and $N_{VRB}^{DL} = N_{RB}^{DL}$ is obtained. Accordingly, according to the localized mapping scheme, the VRBs having the same VRB number are mapped into the PRBs having the same PRB number at the first slot and the second slot. On the other hand, the distributed VRBs are mapped into the PRBs through interleaving. Accordingly, the VRBs having the same VRB number may be mapped into the PRBs having different PRB numbers at the first slot and the second slot. Two PRBs, which are respectively located at two slots of the subframe and have the same VRB number, will be referred to as a pair of VRBs.

Figure 3:
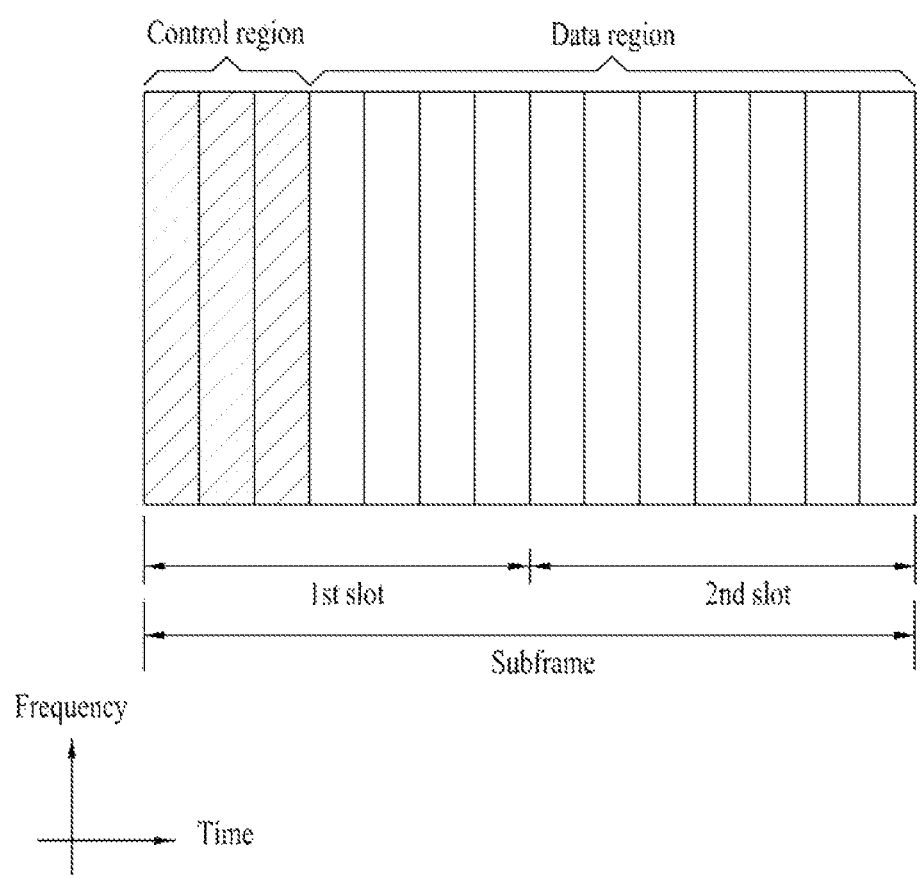
FIG. 3 illustrates an exemplary structure of a DL subframe in a 3rd Generation Partnership project (3GPP) Long Term Evolution (LTE)/LTE-Advanced (LTE-A) system.

FIG. 3 illustrates a downlink (DL) subframe structure used in 3GPP LTE/LTE-A.

Referring to FIG. 3, a DL subframe is divided into a control region and a data region. A maximum of three (four) OFDM symbols located in a front portion of a first slot within a subframe correspond to the control region to which a control channel is allocated. A resource region available for PDCCH transmission in the DL subframe is referred to as a PDCCH region hereinafter. The remaining OFDM symbols correspond to the data region to which a physical downlink shared chancel (PDSCH) is allocated. A resource region available for PDSCH transmission in the DL subframe is referred to as a PDSCH region hereinafter. Examples of downlink control channels used in 3GPP LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative acknowledgment (NACK) signal.

Control information carried on the PDCCH is called downlink control information (DCI). The DCI contains resource allocation information and control information for a UE or a UE group. For example, the DCI includes a transport format and resource allocation information of a downlink shared channel (DL-SCH), a transport format and resource allocation information of an uplink shared channel (UL-SCH), paging information of a paging channel (PCH), system information on the DL-SCH, information about resource allocation of an upper layer control message such as a random access response transmitted on the PDSCH, a transmit control command set with respect to individual UEs in a UE group, a transmit power control command, information on activation of a voice over IP (VoIP), downlink assignment index (DAI), etc. The transport format and resource allocation information of the DL-SCH are also called DL scheduling information or a DL grant and the transport format and resource allocation information of the UL-SCH are also called UL scheduling information or a UL grant. The size and purpose of DCI carried on a PDCCH depend on DCI format and the size thereof may be varied according to coding rate. Various formats, for example, formats 0 and 4 for uplink and formats 1, 1A, 1B, 1C, 1D, 2, 2A, 2B, 2C, 3 and 3A for downlink, have been defined in 3GPP LTE. Control information such as a hopping flag, information on RB allocation, modulation coding scheme (MCS), redundancy version (RV), new data indicator (NDI), information on transmit power control (TPC), cyclic shift demodulation reference signal (DMRS), UL index, channel quality information (CQI) request, DL assignment index, HARQ process number, transmitted precoding matrix indicator (TPMI), precoding matrix indicator (PMI), etc. is selected and combined based on DCI format and transmitted to a UE as DCI.

In general, a DCI format for a UE depends on transmission mode (TM) set for the UE. In other words, only a DCI format corresponding to a specific TM can be used for a UE configured in the specific TM.

A PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). For example, a CCE corresponds to 9 REGs and an REG corresponds to 4 REs. 3GPP LTE defines a CCE set in which a PDCCH can be located for each UE. A CCE set from which a UE can detect a PDCCH thereof is called a PDCCH search space, simply, search space. An individual resource through which the PDCCH can be transmitted within the search space is called a PDCCH candidate. A set of PDCCH candidates to be monitored by the UE is defined as the search space. In 3GPP LTE/LTE-A, search spaces for DCI formats may have different sizes and include a dedicated search space and a common search space. The dedicated search space is a UE-specific search space and is configured for each UE. The common search space is configured for a plurality of UEs. Aggregation levels defining the search space is as follows.

TABLE 3

| Search Space | | | Number of PDCCH |
|---|---|---|---|
| Type | Aggregation Level L | Size [in CCEs] | candidates $M^{(L)}$ |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

A PDCCH candidate corresponds to 1, 2, 4 or 8 CCEs according to CCE aggregation level. An eNB transmits a PDCCH (DCI) on an arbitrary PDCCH candidate with in a search space and a UE monitors the search space to detect the PDCCH (DCI). Here, monitoring refers to attempting to decode each PDCCH in the corresponding search space according to all monitored DCI formats. The UE can detect the PDCCH thereof by monitoring plural PDCCHs. Since the UE does not know the position in which the PDCCH thereof is transmitted, the UE attempts to decode all PDCCHs of the corresponding DCI format for each subframe until a PDCCH having the ID thereof is detected. This process is called blind detection (or blind decoding (BD)).

The eNB can transmit data for a UE or a UE group through the data region. Data transmitted through the data region may be called user data. For transmission of the user data, a physical downlink shared channel (PDSCH) may be allocated to the data region. A paging channel (PCH) and downlink-shared channel (DL-SCH) are transmitted through the PDSCH. The UE can read data transmitted through the PDSCH by decoding control information transmitted through a PDCCH. Information representing a UE or a UE group to which data on the PDSCH is transmitted, how the UE or UE group receives and decodes the PDSCH data, etc. is included in the PDCCH and transmitted. For example, if a specific PDCCH is CRC (cyclic redundancy check)-masked having radio network temporary identify (RNTI) of "A" and information about data transmitted using a radio resource (e.g. frequency position) of "B" and transmission format information (e.g. transport block size, modulation scheme, coding information, etc.) of "C" is transmitted through a specific DL subframe, the UE monitors PDCCHs using RNTI information and a UE having the RNTI of "A" detects a PDCCH and receives a PDSCH indicated by "B" and "C" using information about the PDCCH.

A reference signal (RS) to be compared with a data signal is necessary for the UE to demodulate a signal received from the eNB. A reference signal refers to a predetermined signal having a specific waveform, which is transmitted from the eNB to the UE or from the UE to the eNB and known to both the eNB and UE. The reference signal is also called a pilot. Reference signals are categorized into a cell-specific RS shared by all UEs in a cell and a modulation RS (DM RS) dedicated for a specific UE. A DM RS transmitted by the eNB for demodulation of downlink data for a specific UE is called a UE-specific RS. Both or one of DM RS and CRS may be transmitted on downlink. When only the DM RS is transmitted without CRS, an RS for channel measurement needs to be additionally provided because the DM RS transmitted using the same precoder as used for data can be used for demodulation only. For example, in 3GPP LTE(-A), CSI-RS corresponding to an additional RS for measurement is transmitted to the UE such that the UE can measure channel state information. CSI-RS is transmitted in each transmission period corresponding to a plurality of subframes based on the fact that channel state variation with time is not large, unlike CRS transmitted per subframe.

Figure 4:
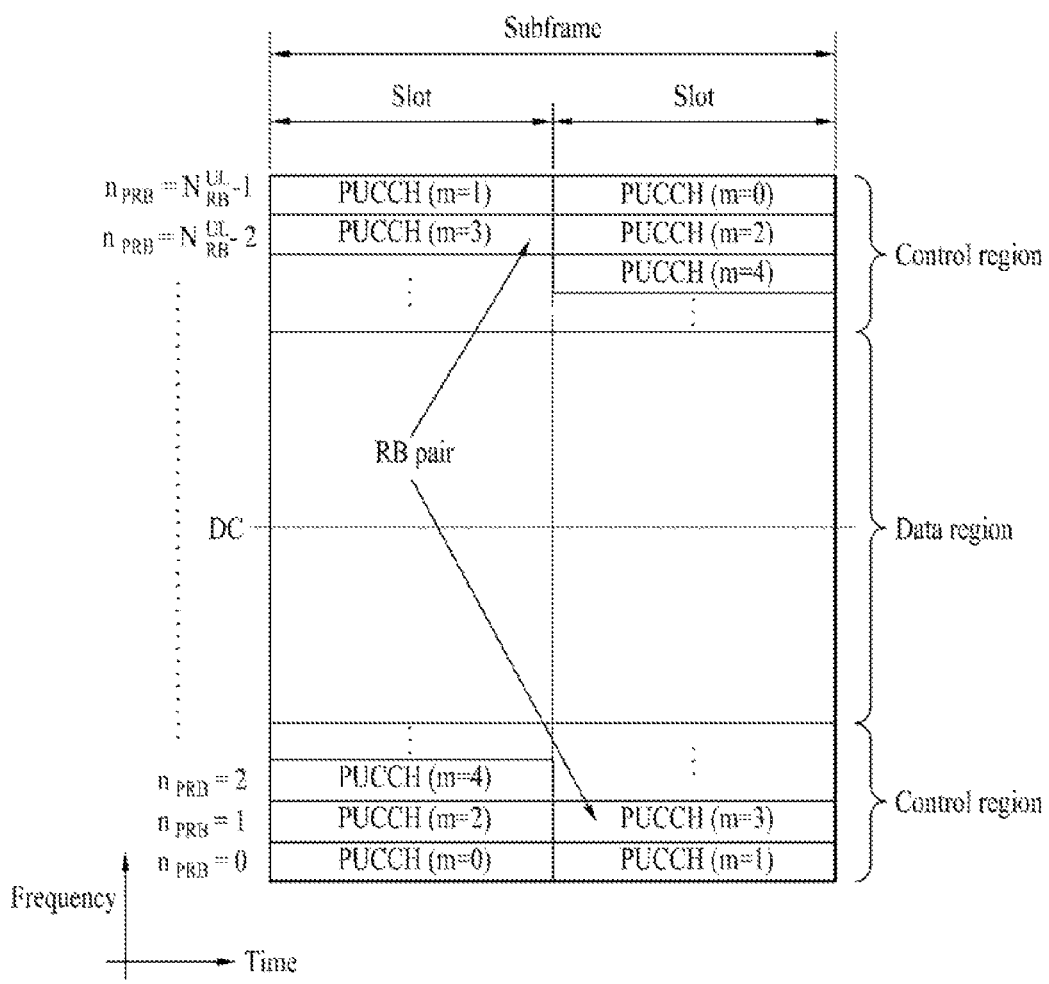
FIG. 4 illustrates an exemplary structure of a UL subframe in the 3GPP LTE/LTE-A system.

FIG. 4 illustrates an exemplary uplink subframe structure used in 3GPP LTE/LTE-A.

Referring to FIG. 4, a UL subframe can be divided into a control region and a data region in the frequency domain. One or more PUCCHs (physical uplink control channels) can be allocated to the control region to carry uplink control information (UCI). One or more PUSCHs (Physical uplink shared channels) may be allocated to the data region of the UL subframe to carry user data.

In the UL subframe, subcarriers spaced apart from a DC subcarrier are used as the control region. In other words, subcarriers corresponding to both ends of a UL transmission bandwidth are assigned to UCI transmission. The DC subcarrier is a component remaining unused for signal transmission and is mapped to the carrier frequency f0 during frequency up-conversion. A PUCCH for a UE is allocated to an RB pair belonging to resources operating at a carrier frequency and RBs belonging to the RB pair occupy different subcarriers in two slots. Assignment of the PUCCH in this manner is represented as frequency hopping of an RB pair allocated to the PUCCH at a slot boundary. When frequency hopping is not applied, the RB pair occupies the same subcarrier.

The PUCCH can be used to transmit the following control information.

Scheduling Request (SR): This is information used to request a UL-SCH resource and is transmitted using On-Off Keying (OOK) scheme.

HARQ ACK/NACK: This is a response signal to a downlink data packet on a PDSCH and indicates whether the downlink data packet has been successfully received. A 1-bit ACK/NACK signal is transmitted as a response to a single downlink codeword and a 2-bit ACK/NACK signal is transmitted as a response to two downlink codewords. HARQ-ACK responses include positive ACK (ACK), negative ACK (HACK), discontinuous transmission (DTX) and NACK/DTX. Here, the term HARQ-ACK is used interchangeably with the term HARQ ACK/NACK and ACK/NACK.

Channel State Indicator (CSI): This is feedback information about a downlink channel. Feedback information regarding MIMO includes a rank indicator (RI) and a precoding matrix indicator (PMI).

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a sounding reference signal (SRS) is configured, the last SC-FDMA symbol of the subframe is excluded from the SC-FDMA symbols available for control information transmission. A reference signal is used to detect coherence of the PUCCH. The PUCCH supports various formats according to information transmitted thereon. Table 4 shows the mapping relationship between PUCCH formats and UCI in LTE/LTE-A.

TABLE 4

| PUCCH format | Modulation scheme | Number of bits per subframe, $M_{bit}$ | Usage | Etc. |
|---|---|---|---|---|
| 1 | N/A | N/A | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Referring to Table 4, PUCCH formats 1/1a/1b are used to transmit ACK/NACK information, PUCCH format 2/2a/2b are used to carry CSI such as CQI/PMI/RI and PUCCH format 3 is used to transmit ACK/NACK information.

Reference Signal (RS)

When a packet is transmitted in a wireless communication system, signal distortion may occur during transmission since the packet is transmitted through a radio channel. To correctly receive a distorted signal at a receiver, the distorted signal needs to be corrected using channel information. To detect channel information, a signal known to both a transmitter and the receiver is transmitted and channel information is detected with a degree of distortion of the signal when the signal is received through a channel. This signal is called a pilot signal or a reference signal.

When data is transmitted/received using multiple antennas, the receiver can receive a correct signal only when the receiver is aware of a channel state between each transmit antenna and each receive antenna. Accordingly, a reference signal needs to be provided per transmit antenna, more specifically, per antenna port.

Reference signals can be classified into an uplink reference signal and a downlink reference signal. In LTE, the uplink reference signal includes:

i) a demodulation reference signal (DMRS) for channel estimation for coherent demodulation of information transmitted through a PUSCH and a PUCCH; and ii) a sounding reference signal (SRS) used for an eNB to measure uplink channel quality at a frequency of a different network.

The downlink reference signal includes:

i) a cell-specific reference signal (CRS) shared by all UEs in a cell;

ii) a UE-specific reference signal for a specific UE only;

iii) a DMRS transmitted for coherent demodulation when a PDSCH is transmitted;

iv) a channel state information reference signal (CSI-RS) for delivering channel state information (CSI) when a downlink DMRS is transmitted;

v) a multimedia broadcast single frequency network (MBSFN) reference signal transmitted for coherent demodulation of a signal transmitted in MBSFN mode; and vi) a positioning reference signal used to estimate geographic position information of a UE.

Reference signals can be classified into a reference signal for channel information acquisition and a reference signal for data demodulation. The former needs to be transmitted in a wide band as it is used for a UE to acquire channel information on downlink transmission and received by a UE even if the UE does not receive downlink data in a specific subframe. This reference signal is used even in a handover situation. The latter is transmitted along with a corresponding resource by an eNB when the eNB transmits a downlink signal and is used for a UE to demodulate data through channel measurement. This reference signal needs to be transmitted in a region in which data is transmitted.

In an enhanced wireless communication system such as LTE Rel-12, a network based interference cancellation scheme or a network assisted interference and cancellation suppression (NAICS) scheme for cancelling interference data from neighboring cells or transmission points by aid of a network has been discussed.

In the present invention, a method for providing information about resource region assignment when a UE having NAICS capabilities cancels/mitigates an interference signal received from neighboring base stations and a method of utilizing this information for interference signal cancellation/mitigation at a UE will be described. Here, the UE having NAICS capabilities is referred to as an "NAICS UE" and a base station for transmitting an interference signal having influence on the NAICS UE is referred to as an "interference base station".

In order for the NAICS UE to efficiently perform interference cancellation/mitigation, a variety of control information (e.g., RI, PMI, modulation order or MCS, etc.) of an interference signal is necessary. Such control information may be received from the base station via a semi-static signal or a dynamic signal. The control information may be sent from a serving base station or an interference base station to the NAICS UE.

Figure 5:
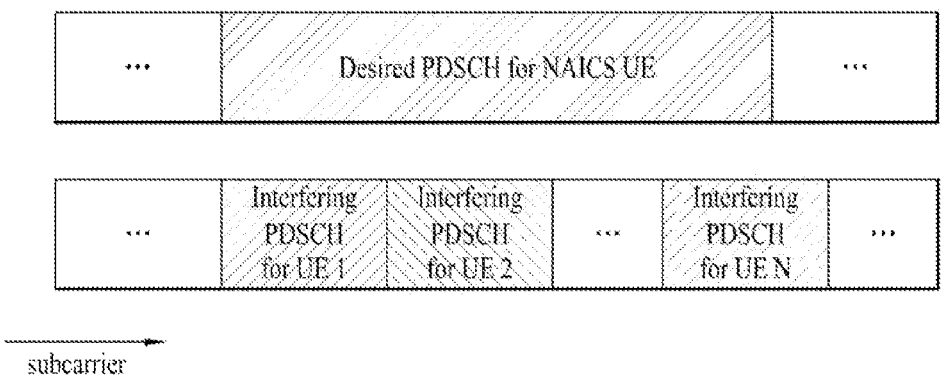
FIG. 5 illustrates interference resource assignment of a serving base station and an interfering base station.

FIG. 5 shows an example of resource region assignment of a serving base station and an interference base station. If there is a plurality of PDSCHs to be assigned to a UE having low traffic or a plurality of PDSCHs for TCP ACK/NACK, VoIP UE or RRC signaling, a resource region may be assigned as shown in FIG. 5. In this case, all control information corresponding to N interfering PDSCHs should be known in order to perform a cancellation/mitigation operation of an interference signal. If one PDSCH is composed of one RB, interference signal control information corresponding in number to the number of RBs scheduled to an NAICS UE may be necessary in the worst case. Since scheduling of the interference base station may be changed in specific time or subframe units, control information of the interference signal may be dynamically signaled in interfering PDSCH units (or, more specifically, in RB or subband units), for efficient interference signal cancellation/mitigation.

Since the control information of the interference signal is included in DCI transmitted when the interference base station performs scheduling with respect to a UE thereof, the NAICS UE may directly use this control information. Alternatively, the interference base station notifies neighboring base stations of the DCI and the serving base station of the NAICS UE may transmit the DCI to the NAICS UE. DCI including the control information of the interference signal is also referred to as "interfering DCI". The NAICS UE should detect a search space (SS) in order to use the interfering DCI and discriminate detection errors with respect to the interfering DCI via CRC scrambled with a specific identifier. Since the NAICS UE requires control information of all interfering PDSCHs corresponding to an RB region scheduled thereto, a plurality of identifiers for identifying the interfering DCI is necessary.

In the present invention, a detailed method for providing interfering DCI using a plurality of identifiers such that an NAICS UE uses the interfering DCI will be described. In an LTE system, CRC bits are attached to DCI in order to discriminate detection errors for DCI transmission and are scrambled with a radio network temporary identifier (RNTI), which is a UE identifier, and the DCI is transmitted. In addition, the UE may estimate the SS for detecting the DCI via the RNTI value and the aggregation level of the DCI. Hereinafter, although the detailed operation of the present invention is described using the LTE system, the above operations are applicable to arbitrary wireless communication systems for detecting an SS for a resource region, in which a UE transmits DCI, via a UE identifier and performing error detection using CRC scrambled with a UE identifier.

A shared RNTI (S-RNTI) may be defined and shared among NAICS UEs, for interference cancellation/mitigation of the NAICS UE. Interfering DCI corresponding to one interfering PDSCH is transmitted by scrambling CRC bits using a sum of the S-RNTI and an RB number (or index) corresponding to one RB in the interfering PDSCH (that is, (S-RNTI+RB number)). The interfering DCI may be transmitted from the serving base station to the NAICS UE thereof or may be transmitted from the interference base station to neighboring NAICS UEs in a broadcast form.

In order for the NAICS UE to perform interference cancellation/mitigation using interfering DCI, information about which RB configures each interfering PDSCH should be preferentially sent to the NAICS UE. This information is called "interfering PDSCH assignment information". The interfering PDSCH assignment information may be transmitted using a dynamic signal. At this time, in order to avoid confusion with interfering DCI including CRC bits scrambled with (S-RNTI+RB number), interfering PDSCH assignment information may be transmitted by scrambling CRC bits with (S-RNTI−1) or (S-RNTI−predefined value). By imposing cooperation or scheduling restrictions between base stations, the serving base station may provide the interfering PDSCH assignment information to the NAICS UE using semi-static signaling such as RRC signaling.

As an RB signal used for scrambling of the interfering DCI, one of RBs included in the interfering PDSCH is determined and used via a predetermined rule. For example, a lowest or highest RB number in one interfering PDSCH may be used. The NAICS UE may check which RB is included in the interfering PDSCH using the interfering PDSCH assignment information and estimate or determine the RB number used for scrambling therefrom. Alternatively, information about which RB number is used to scramble the CRC bits of the interfering DCI corresponding to each interfering PDSCH may be included in the interfering PDSCH assignment information.

The SS for detecting the interfering DCI is determined by the (S-RNTI+RB number) and the aggregation level. The aggregation level may be fixed to one value in order to minimize blind detection complexity of the NAICS UE.

The NAICS UE may check to which interfering PDSCH an RB scheduled thereto corresponds via the interfering PDSCH assignment information and detect only interfering DCI corresponding to the interfering PDSCH causing interference to acquire control information of an interference signal, thereby performing interference cancellation/mitigation.

Figure 6:
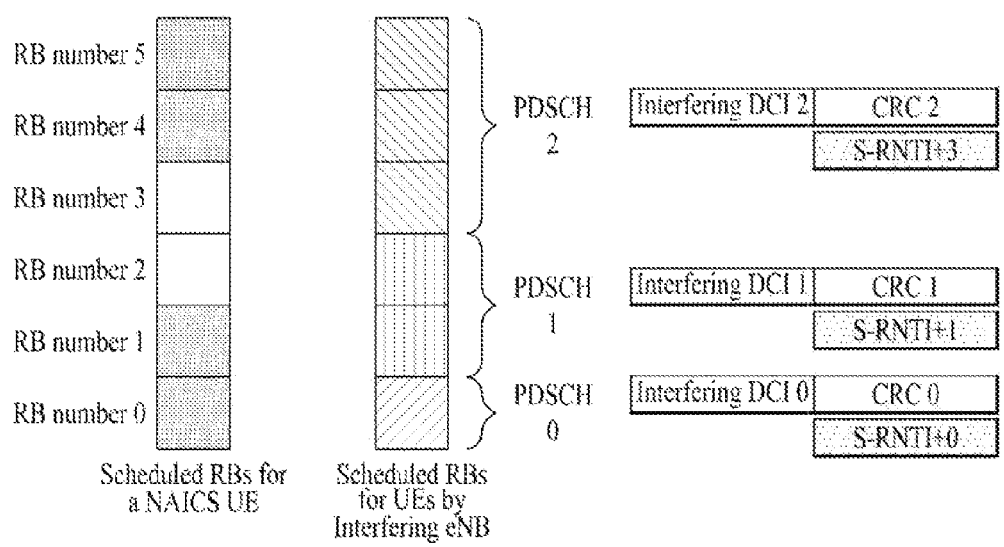
FIG. 6 shows interference control information according to an embodiment of the present invention.

For example, if interfering PDSCH resource assignment of the interference base station shown in FIG. 6 is assumed and the interfering PDSCH resource assignment information is sent to the NAICS UE, the NAICS UE may detect interfering DCI for interfering PDSCHs corresponding to RBs 0, 1, 4 and 5 scheduled therefor, that is, interfering PDSCHs 0, 1 and 2. If the interfering DCI is transmitted by scrambling CRC bits using the sum of the lowest RB number of each interfering PDSCH and the S-RNTI, the NAICS UE may detect interfering DCI 0, 1 and 2 corresponding to interfering PDSCHs 0, 1 and 2 using (S-RNTI+0), (S-RNTI+1) and (S-RNTI+3) and acquire control information of each interference PDSCH. The NAICS UE may perform interference cancellation/mitigation of RB 0 using interference DCI 0, perform interference cancellation/mitigation of RB 1 using interfering DCI 1, and perform interference cancellation/mitigation of RB 4 and RB 5 using interfering DCI 2.

Alternatively, interfering DCI for all RBs corresponding to the interfering PDSCHs may be defined without the interfering PDSCH assignment information. In this case, since the NAICS UE may not know assignment of resource region to the interfering PDSCHs, interfering DCI for all RBs scheduled thereto should be detected. If the interfering PDSCH assignment information is not provided to the NAICS UE, the interfering DCI is transmitted by scrambling CRC bits using the sum of the S-RNTI and one of the RB numbers included in the interfering PDSCH.

If the interfering PDSCH assignment information is not provided, the NAICS UE requires information about which RB is used to scramble the CRC bits of interfering DCI corresponding to each interfering PDSCH. As one method for solving the above problem, interfering DCI may be generated with respect to all RBs of the interfering PDSCH. However, if one interfering PDSCH is composed of a plurality of RBs, since interfering DCI for RBs included in one interfering PDSCH includes the same information, processing load of the NAICS UE can be reduced by notifying the NAICS UE of the information.

Accordingly, if the interference PDSCH assignment information is not provided, interfering DCI corresponding to one interfering PDSCH is transmitted by scrambling CRC bits using the sum of the S-RNTI and the RB number corresponding to one RB in the interfering PDSCH and may include control information of interference signal for the remaining RBs belong to the interfering PDSCH.

For example, in the example of FIG. 6, interfering DCI 0 is scrambled with (S-RNTI+1) and is transmitted once, interfering DCI 1 is scrambled with (S-RNTI+1) and (S-RNTI+2) and is transmitted twice, and interfering DCI 2 is scrambled with (S-RNTI+3), (S-RNTI+4) and (S-RNTI+5) and is transmitted three times. In addition, when the NAICS UE detects interfering DCI 2, by indicating that interfering DCI 2 includes control information of the interference signal corresponding to RBs 3, 4 and 5, the NAICS UE may confirm the control information of the interference signal for RB 4 and RB 5 among the RBs scheduled thereto via detection of interfering DCI 2, thereby performing interference cancellation/mitigation. At this time, when the NAICS UE detects interfering DCI 2 for RB 4 using (S-RNTI+4), the NAICS UE may not attempt interfering DCI detection with respect to RB 5.

Alternatively, the serving base station of the NAICS UE may transmit one interfering DCI for each an interfering PDSCH using a specific RB number (or index) among RBs scheduled to the NAICS UE (e.g., a lowest RB number among RB number(s) of RB(s) scheduled to the NAICS UE which overlaps the RB of each interfering PDSCH). For example, the serving base station scrambles CRC bits using RB 0 which is a lowest index among RBs scheduled to the NAICS UE overlapping interfering PDSCH 0 to configure interfering DCI 0, scrambles CRC bits using RB 1 which is a lowest index among RBs scheduled to the NAICS UE overlapping interfering PDSCH 1 to configure interfering DCI 1, scrambles CRC bits using RB 4 which is a lowest index among RBs scheduled to the NAICS UE overlapping interfering PDSCH 2 to configure interfering DCI 2, and transmits interfering DCI to the NAICS UE. The NAICS UE attempts blind detection of the interfering DCI using the RB number scheduled thereto, that is, attempts blind detection with respect to RB 0, RB 1, RB 4 and RB 5, and, as a result, detects interfering DCI 0, interfering DCI 1 and interfering DCI 2.

Even in this case, if a plurality of RBs overlapping a specific interfering PDSCH is scheduled to the NAICS UE, information indicating that control information of interference signal for the remaining RBs is the same as a interfering DCI corresponding to the specific interfering PDSCH may be included in the interfering DCI. The plurality of RBs overlapping the specific interfering PDSCH may have consecutive indices as depicted FIG. 6.

For example, in FIG. 6, interfering DCI 2 may be transmitted by scrambling CRC bits using the value of (S-RNTI+ 4) and may include information indicating that control information of interference signal for RB 5 is the same as interfering DCI 2. Accordingly, if the NAICS UE succeeds in blind detecting using RB4, the NAICS UE may obtain control information of interference signal. Therefore, it is possible to prevent interfering DCI from being excessively generated and blind detection from being performed. That is, the serving base station may skip generation/transmission of interfering DCI using RB5, and the NAICS UE may skip blind detecting using RB5.

Figure 7:
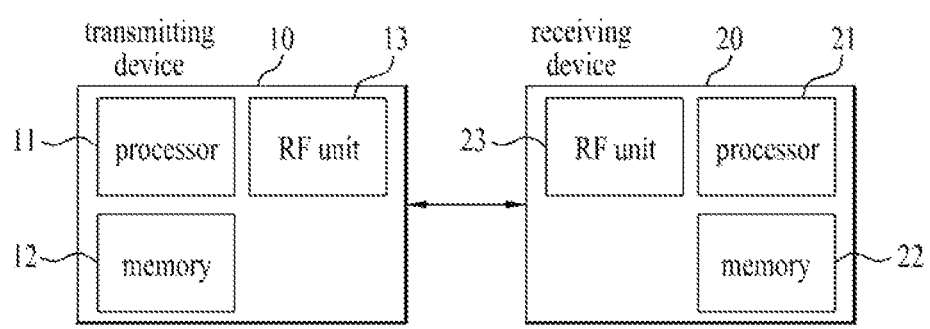
FIG. 7 is a block diagram of apparatuses for implementing an embodiment(s) of the present invention.

FIG. 7 is a block diagram of a transmitting device 10 and a receiving device 20 configured to implement exemplary embodiments of the present invention. Referring to FIG. 7, the transmitting device 10 and the receiving device 20 respectively include radio frequency (RF) units 13 and 23 for transmitting and receiving radio signals carrying information, data, signals, and/or messages, memories 12 and 22 for storing information related to communication in a wireless communication system, and processors 11 and 21 connected operationally to the RF units 13 and 23 and the memories 12 and 22 and configured to control the memories 12 and 22 and/or the RF units 13 and 23 so as to perform at least one of the above-described embodiments of the present invention.

The memories 12 and 22 may store programs for processing and control of the processors 11 and 21 and may temporarily storing input/output information. The memories 12 and 22 may be used as buffers. The processors 11 and 21 control the overall operation of various modules in the transmitting device 10 or the receiving device 20. The processors 11 and 21 may perform various control functions to implement the present invention. The processors 11 and 21 may be controllers, microcontrollers, microprocessors, or microcomputers. The processors 11 and 21 may be implemented by hardware, firmware, software, or a combination thereof. In a hardware configuration, Application Specific Integrated Circuits (ASICs), Digital Signal Processors (DSPs), Digital Signal Processing Devices (DSPDs), Programmable Logic Devices (PLDs), or Field Programmable Gate Arrays (FPGAs) may be included in the processors 11 and 21. If the present invention is implemented using firmware or software, firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 is scheduled from the processor 11 or a scheduler connected to the processor 11 and codes and modulates signals and/or data to be transmitted to the outside. The coded and modulated signals and/or data are transmitted to the RF unit 13. For example, the processor 11 converts a data stream to be transmitted into K layers through demultiplexing, channel coding, scrambling and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include Nt (where Nt is a positive integer) transmit antennas.

A signal processing process of the receiving device 20 is the reverse of the signal processing process of the transmitting device 10. Under the control of the processor 21, the RF unit 23 of the receiving device 10 receives RF signals transmitted by the transmitting device 10. The RF unit 23 may include Nr receive antennas and frequency down-converts each signal received through receive antennas into a baseband signal. The RF unit 23 may include an oscillator for frequency down-conversion. The processor 21 decodes and demodulates the radio signals received through the receive antennas and restores data that the transmitting device 10 wishes to transmit.

The RF units 13 and 23 include one or more antennas. An antenna performs a function of transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. A signal transmitted through each antenna cannot be decomposed by the receiving device 20. A reference signal (RS) transmitted through an antenna defines the corresponding antenna viewed from the receiving device 20 and enables the receiving device 20 to perform channel estimation for the antenna, irrespective of whether a channel is a single RF channel from one physical antenna or a composite channel from a plurality of physical antenna elements including the antenna. That is, an antenna is defined such that a channel transmitting a symbol on the antenna may be derived from the channel transmitting another symbol on the same antenna. An RF unit supporting a MIMO function of transmitting and receiving data using a plurality of antennas may be connected to two or more antennas.

In embodiments of the present invention, a UE serves as the transmission device 10 on uplink and as the receiving device 20 on downlink. In embodiments of the present invention, an eNB serves as the receiving device 20 on uplink and as the transmission device 10 on downlink.

The transmitting device and/or the receiving device may be configured as a combination of one or more embodiments of the present invention.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other. Accordingly, the invention should not be limited to the specific embodiments described herein, but should be accorded the broadest scope consistent with the principles and novel features disclosed herein.

The present invention may be used for a wireless communication apparatus such as a user equipment (UE), a relay and an eNB.

According to one embodiment of the present invention, it is possible to efficiently transmit and receive information for interference cancellation and to perform an efficient interference cancellation operation.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for receiving information for interference cancellation in a user equipment (UE), the method comprising:
   detecting downlink control information (DCI) with cyclic redundancy check (CRC) bits scrambled using an index of a specific resource block (RB) scheduled for the UE, the DCI including interference control information related to an interference signal and the specific RB corresponding to an RB among a set of RBs scheduled for the UE and overlapped with one or more consecutive RBs in which the interference signal is transmitted; and
   performing cancellation of the interference signal in the set of RBs using the interference control information.

2. The method according to claim 1, further comprising determining a search space (SS) for detecting the DCI using the index of the specific RB.

3. The method according to claim 2, wherein the SS is determined based on a summing value of a UE identifier and the index of the specific RB.

4. The method according to claim 1, further comprising receiving configuration information of the one or more consecutive RBs.

5. The method according to claim 1, wherein the CRC bits are further scrambled with a summing value of a UE identifier and the index of the specific RB.

6. A method for transmitting information for interference cancellation in a user equipment (UE), the method performed by a serving base station of the UE and comprising:
   receiving interference control information from an interference base station, the interference control information related to an interference signal transmitted in one or more consecutive resource blocks (RBs); and
   transmitting downlink control information (DCI) to the UE, the DCI including the interference control information with cyclic redundancy check (CRC) bits scrambled using an index of a specific RB,
   wherein the specific RB corresponds to a RB among a set of RBs scheduled for the UE and is overlapped with the one or more consecutive RBs.

7. The method according to claim 6, further comprising transmitting configuration information of the one or more consecutive RBs to the UE.

8. A user equipment (UE) for receiving information for interference cancellation, the UE comprising:
   a radio frequency (RF) unit; and
   a processor configured to:
      control the RF unit;
      detect downlink control information (DCI) with cyclic redundancy check (CRC) bits scrambled using an index of a specific resource block (RB) scheduled for the UE, the DCI including interference control information related to an interference signal and the specific RB corresponding to an RB among a set of RBs scheduled for the UE and overlapped with one or more consecutive RBs in which the interference signal is transmitted; and
      perform cancellation of the interference signal in the set of RBs using the interference control information.

9. The method according to claim 8, wherein the CRC bits are further scrambled with a summing value of a UE identifier and the index of the specific RB.

10. The UE according to claim 8, wherein the processor is further configured to determine a search space (SS) for detecting the DCI using the index of the specific RB.

11. The method according to claim 10, wherein the SS is determined based on a summing value of a UE identifier and the index of the specific RB.

12. The method according to claim 8, wherein the processor is further configured to control the RF unit to receive configuration information of the one or more consecutive RBs.

13. A base station for transmitting information for interference cancellation, the base station comprising:
   a radio frequency (RF) unit; and
   a processor configured to control the RF unit to:
      receive interference control information from an interference base station, the interference control information related to an interference signal transmitted in one or more consecutive resource blocks (RBs) and
      transmit downlink control information (DCI) to the UE, the DCI including the interference control information with cyclic redundancy check (CRC) bits scrambled using an index of a specific RB,
      wherein the specific RB corresponds to a RB among a set of RBs scheduled for the UE and is overlapped with the one or more consecutive RBs.

14. The base station according to claim 13, wherein the processor is further configured to control the RF unit to transmit configuration information of the one or more consecutive RBs to the UE.

* * * * *